US010461635B1

(12) United States Patent
Din (10) Patent No.: US 10,461,635 B1
(45) Date of Patent: Oct. 29, 2019

(54) LOW VIN HIGH EFFICIENCY CHARGEPUMP

(71) Applicant: Analog Devices Global Unlimited Company, Hamilton (BM)

(72) Inventor: Jose Bernardo Din, Metro Manila (PH)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 15/980,342

(22) Filed: May 15, 2018

(51) Int. Cl.
G05F 1/10 (2006.01)
*H02M 3/07* (2006.01)
G05F 1/46 (2006.01)

(52) U.S. Cl.
CPC ............... *H02M 3/07* (2013.01); *G05F 1/46* (2013.01)

(58) Field of Classification Search
None
See application file for complete search history.

(56) References Cited

U.S. PATENT DOCUMENTS

| | | | |
|---|---|---|---|
| 5,301,097 A | 4/1994 | McDaniel | |
| 5,874,850 A | 2/1999 | Pulvirenti et al. | |
| 6,429,723 B1 | 8/2002 | Hastings | |
| 6,603,346 B2 * | 8/2003 | Sawada | H02M 3/073 327/536 |
| 6,677,806 B2 | 1/2004 | Bloch | |
| 6,819,162 B2 | 11/2004 | Pelliconi | |
| 6,992,522 B2 * | 1/2006 | Ido | H02M 3/073 327/536 |
| 6,995,602 B2 | 2/2006 | Pelliconi | |
| 7,030,683 B2 | 4/2006 | Pan et al. | |
| 7,046,076 B2 | 5/2006 | Daga et al. | |
| 7,113,023 B2 | 9/2006 | Cernea | |
| 8,896,367 B1 * | 11/2014 | Lin | H02M 3/073 327/536 |
| 9,385,596 B1 * | 7/2016 | Yang | H02M 3/07 |
| 9,531,262 B2 | 12/2016 | Peppiette et al. | |
| 2004/0246044 A1 | 12/2004 | Myono et al. | |
| 2007/0126494 A1 | 6/2007 | Pan | |
| 2010/0289567 A1 * | 11/2010 | Iida | H03H 15/00 327/554 |
| 2012/0194153 A1 | 8/2012 | Cozzolino | |
| 2015/0194879 A1 | 7/2015 | Peppiette et al. | |
| 2015/0372591 A1 * | 12/2015 | Seshita | H02M 3/073 327/536 |

(Continued)

Primary Examiner — Lincoln D Donovan
Assistant Examiner — Khareem E Almo
(74) Attorney, Agent, or Firm — Schwegman Lundberg & Woessner, P.A.

(57) ABSTRACT

A charge pump circuit comprises a first charge transfer circuit path coupled including a first boost capacitor coupled to a first clock input, a first charge switch coupled to a circuit input, and a first discharge switch coupled to a circuit output; a second charge transfer circuit path including a second boost capacitor coupled to a second clock input, a second charge switch coupled to the circuit input, and a second discharge switch coupled to the circuit output; a first charge control circuit including a first gate switch coupled to a gate input of the first charge switch, and a first gate-drive capacitor coupled to the gate input of the second charge switch; and a second charge control circuit including a second gate switch coupled to a gate input of the second charge switch, and a second gate-drive capacitor coupled to the gate input of the first charge switch.

25 Claims, 8 Drawing Sheets

(56) References Cited

U.S. PATENT DOCUMENTS

2017/0149331 A1* 5/2017 Kruiskamp ............ H02M 3/073
2017/0302271 A1* 10/2017 Kato ........................ G11C 7/06
2017/0346392 A1* 11/2017 Liu ......................... H02M 3/07
2018/0321702 A1* 11/2018 Chen ....................... G05F 3/262

* cited by examiner

LOW VIN HIGH EFFICIENCY CHARGEPUMP

FIELD OF THE DISCLOSURE

This document relates to integrated circuits and in particular to charge pump circuits or voltage boost circuits that provide a boosted voltage from a supply voltage.

BACKGROUND

In integrated circuit designs there may be a need to boost a supply voltage (e.g., a battery voltage) to a higher voltage. This boosting can be accomplished. using a charge pump circuit in which charge is transferred to capacitors and then added to produce an output voltage that exceeds the voltage supply of the charge pump circuit. High efficiency circuits are desired for low power applications. However, charge pump circuits can be inefficient due to leakage and other parasitic effects during operation of the circuit.

SUMMARY OF THE DISCLOSURE

This document relates generally to integrated circuits, and in particular to circuits that generate a boosted voltage from an input voltage such as a supply voltage for an integrated circuit. In some aspects, a charge pump circuit comprises a first charge transfer circuit path coupled including a first boost capacitor coupled to a first clock input, a first charge switch coupled to a circuit input, and a first discharge switch coupled to a circuit output; a second charge transfer circuit path including a second boost capacitor coupled to a second clock input, a second charge switch coupled to the circuit input, and a second discharge switch coupled to the circuit output; a first charge control circuit including a first gate switch coupled to a gate input of the first charge switch, and a first gate-drive capacitor coupled to the gate input of the second charge switch; and a second charge control circuit including a second gate switch coupled to a gate input of the second charge switch, and a. second gate-drive capacitor coupled to the gate input of the first charge switch.

In some aspects, a charge pump circuit comprises a first charge transfer circuit path coupled including a first boost capacitor coupled to a first clock input, a first charge switch coupled to a circuit input, and a first discharge switch coupled to a circuit output; a second charge transfer circuit path including a second boost capacitor coupled to a second clock input, a second charge switch coupled to the circuit input, and a second discharge switch coupled to the circuit output; a first charge control circuit including a first gate switch coupled to a gate input of the first discharge switch, and a first gate-drive capacitor coupled to a third clock input and the gate input of the second discharge switch; and a second charge control circuit including a second gate switch coupled to a gate input of the second discharge switch, and a second gate-drive capacitor coupled to a fourth clock input and the gate input of the first discharge switch.

In some aspects, an electronic circuit comprises a charge pump circuit, a pass circuit including a gate input; and a low drop LDO circuit coupled to the charge pump circuit output and configured to provide a regulated voltage to the gate input of the pass circuit. The charge pump circuit includes a first charge transfer circuit path coupled including a first boost capacitor coupled to a first clock input, a first charge switch coupled to a circuit input, and a first discharge switch coupled to a circuit output; a second charge transfer circuit path including a second boost capacitor coupled to a second clock input and a gate input of the first discharge switch, a second charge switch coupled to the circuit input, and a second discharge switch coupled to the circuit output and including a gate input coupled to the first boost capacitor, a first charge control circuit including a first gate switch coupled to a gate input of the first charge switch, and a first gate-drive capacitor coupled to a third clock input and the gate input of the second charge switch; and a second charge control circuit including a second gate switch coupled to a gate input of the second charge switch, and a second gate-drive capacitor coupled to a fourth clock input and the gate input of the first charge switch.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This document relates to charge pump circuits that generate a boosted output voltage higher than the input supply voltage. For low power applications, it is desirable to operate charge pump circuits at a low input voltage (VIN). However, conventional charge pump circuits can be inefficient at low voltages.

Figure 1:
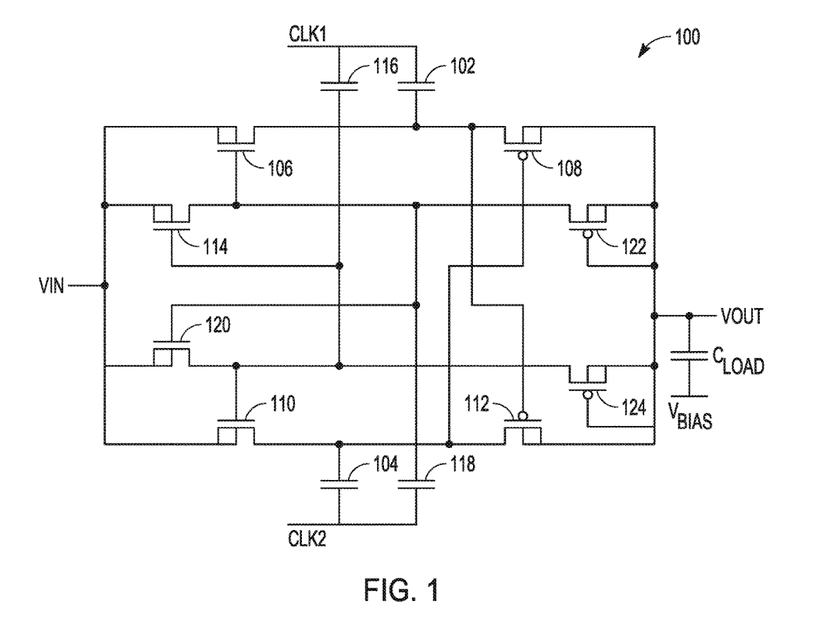
FIG. 1 is a circuit diagram of charge pump circuit in an aspect.

FIG. 1 is a circuit diagram of a charge pump circuit 100 in an aspect. The circuit includes two asynchronous charge transfer circuit paths. In the first part of a charge-discharge cycle, a boost capacitor 102 of one of the charge transfer paths is charged using the input voltage VIN, and in the second part of the charge-discharge cycle, the voltage on the boost capacitor 102 is added to the voltage of a clock signal (CLK1) and provided to the output VOUT. This charge-discharge cycling of the boost capacitor is alternated with charge-discharge cycling of the boost capacitor 104 of the other charge transfer path to generate the output voltage (VOUT). If the voltage of the CLK signals is nearly the same as VIN, the generated VOUT is approximately twice VIN.

In FIG. 1, the first charge transfer circuit path includes boost capacitor 102, charge switch 106, and discharge switch 108. The switches can be field effect transistor (FETs). As shown in FIG. 1, the charge switch 106 can be an n-channel FET (NFET or NMOS transistor) and discharge switch 108 can be a p-channel FET (PFET or PMS transistor). The boost capacitor 102 is connected to a clock signal (CLK1). On a first phase of the clock signal, the charge switch 106 is activated to provide the input voltage to the boost capacitor when the clock signal is LOW. On a second phase of the clock signal, the discharge switch 108 is activated, and the voltage of the boost capacitor VIN is added to the clock signal and provided to the circuit output (VOUT). Capacitor CLOAD at the output represents the output capacitive load. Voltage Vias can be circuit ground or another voltage level.

The second charge transfer circuit path includes boost capacitor 104, charge switch 110, and discharge switch 112. As in the first charge transfer path, the charge switch 110 can be an NFET and the discharge switch 112 can be a PFET. The boost capacitor 104 is connected to a second clock signal (CLK2). The charge transfer of the second charge transfer path works similar to the change transfer of the first charge transfer path except that the charging and discharging of the boost capacitor 104 is out of phase with the charging and discharging of boost capacitor 102.

Figure 2:
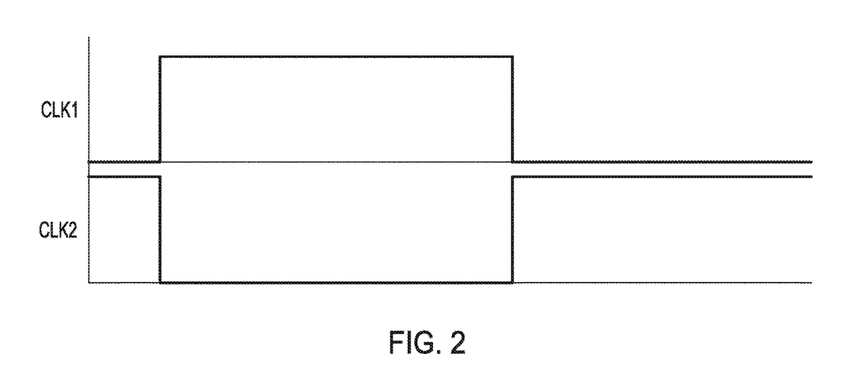
FIG. 2 is a timing diagram of clock signals used to drive a charge pump circuit in an aspect.

FIG. 2 is a timing diagram of clock signals used to drive the charge pump circuit of FIG. 1 in an aspect. The clock signals each have a 50% duty cycle and have opposite polarity or opposite phase. As an example, the clock signals may each have a frequency of forty megahertz (40 MHz). Because the charge transfer paths operate with opposite phase, the voltage provided to the circuit output is approximately VIN plus the voltage of the clock signals minus voltage drops of passing through the switches and losses of the capacitors.

Returning to FIG. 1, the charge pump circuit 100 also includes charge control circuits to control the gate input of the charge switches. The first charge control circuit includes gate-drive capacitor 116 that is coupled to the gate input of the second charge switch 110 and clock signal CLK1. The second charge control circuit includes gate-drive capacitor 118 that is coupled to the gate input of the first charge switch 106 and clock signal CLK2. The capacitance of the gate-drive capacitors is smaller than the capacitance of the boost capacitors. The gate-drive capacitors are charged when the clock signals are LOW, and the voltage on the gate-drive capacitors is used to drive the gates of the charge switches. The gate inputs of the discharge switches are driven by cross-coupling the boost capacitors to the gate inputs. The first boost capacitor 102 is coupled to the gate input of the second discharge switch 112, and the second boost capacitor 104 is coupled to the gate input of the first discharge switch 108.

The first charge control circuit also includes gate switch 114 coupled to the gate input of the first charge switch 106, and the second charge control circuit includes gate switch 120 coupled to the gate input of the second charge switch 110. In the example of FIG. 1, gate switches 114 and 120 are NFETs. Controlling the gate input of the discharge switches with the boost capacitors and controlling the gate inputs of the charge switches with separate gate-drive capacitors can reduce the effect of parasitic charge sharing at the gate inputs of the charge and discharge switches.

The charge pump circuit 100 also includes a clamping circuit coupled to the gates of the charge switches. In FIG. 1, the clamping circuit includes PFETs 122 and 124 with the source electrically shorted to the gate. In certain aspects, diodes can be substituted for PFETs 122 and 124. The gate switches and the clamping circuit serve to limit the voltage at the gates of the charge switches to prevent the voltage across the gate terminals from exceeding the breakdown voltage.

Figure 3:
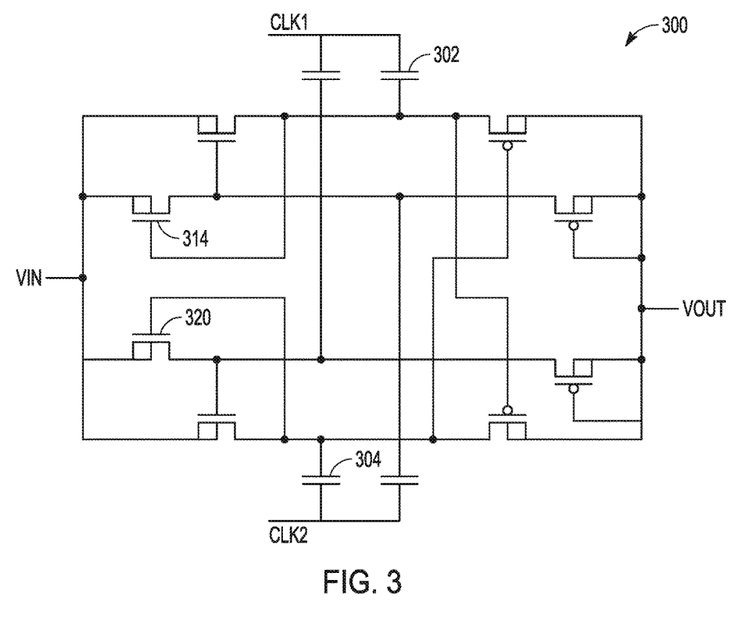
FIG. 3 is a circuit diagram of a charge pump circuit in another aspect.

FIG. 3 is a circuit diagram of a charge pump circuit 300 in another aspect. Similar to the circuit of FIG. 1, the charge pump circuit includes two charge transfer paths and two control circuits. The circuit of FIG. 3 differs from the circuit of FIG. 1 in that the gate inputs to the gate switches are controlled by the boost capacitors. The gate input of gate switch 314 is coupled to boost capacitor 302, and the gate input of gate switch 320 is coupled to boost capacitor 304.

Figure 4:
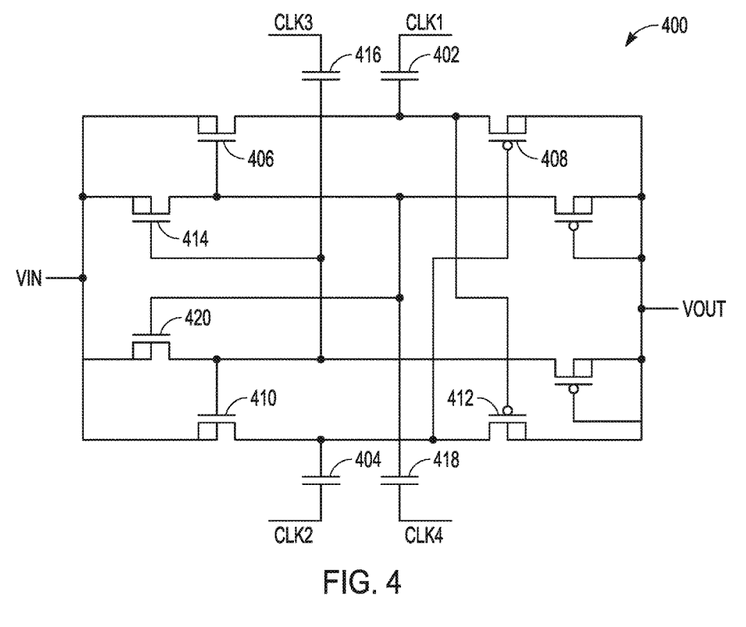
FIG. 4 is a circuit diagram of a charge pump circuit in another aspect.

FIG. 4 is a circuit diagram of a charge pump circuit 400 in another aspect. The circuit is the same as the charge pump circuit 200 of FIG. 2 except that separate clock inputs receive separate clock signals for the boost capacitors and the gate drive capacitors. Clock signal CLK1 and clock signal CLK 2 are connected to boost capacitors 402 and 404 respectively as in the circuit of FIG. 1. A third clock signal CLK3 separate from CLK1 is provided to gate-drive capacitor 416, and a fourth clock signal CLK4 separate from clock signal CLK2 is provided to gate-drive capacitor 418. Different switches are clock on different phases of the four clock signals. This prevents reverse current flowing from the circuit output toward the circuit input. The 4-phase clock signaling ensures that the NFET charge switches are off before the PFET discharge switches turn on. It also ensures that the clock signal at a boost capacitor is HIGH and the boost capacitor is ready to transfer charge before the discharge switches turn on. The 4-phase clock signaling operation may be more efficient for higher VIN voltages.

Figure 5:
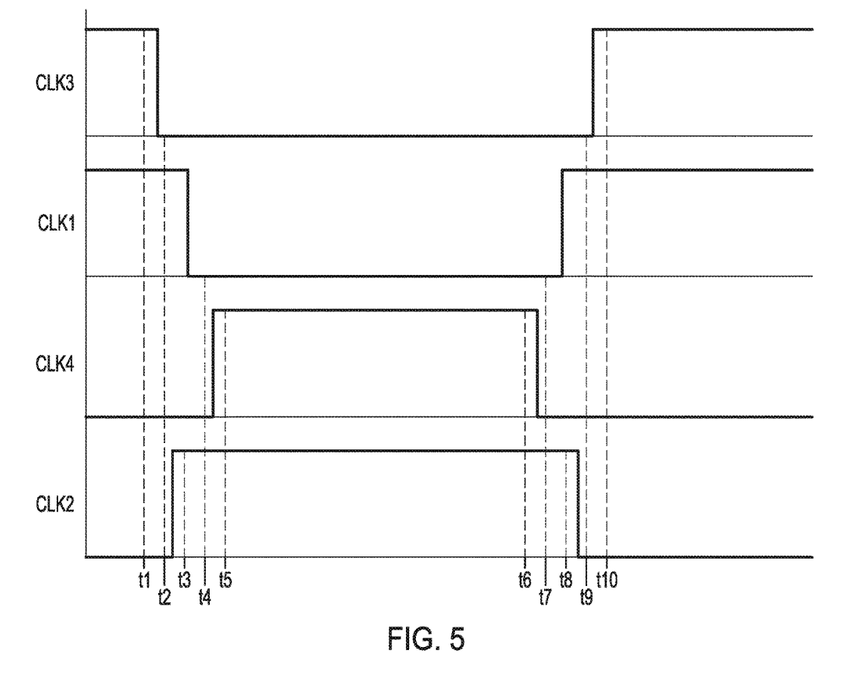
FIG. 5 is a timing diagram of clock signals used to drive a charge pump circuit in another aspect.

FIG. 5 is a timing diagram of clock signals used to drive the charge pump circuit of FIG. 4 in an aspect. The clock signals can be generated using a clock circuit included on the same integrated circuit as the charge pump circuit. In a non-limiting example, the duty cycle (i.e., the time that the clock signal is HIGH compared to the time that the clock signal is LOW) for clock signals CLK3 and CLK2 can be 44%, and the duty cycle for clock signals CLK1 and CLK4 can be 52%. Clock signals CLK1 and CLK4 may be non-overlapping clock signals, and clock signals CLK2 and CLK3 may be non-overlapping clock signals.

The 4-phase clock signaling advances the charge pump circuit 400 through five operating states in an aspect. In the timing diagram, time it corresponds to State 1 in which the clock signals (CLK1, CLK3) to capacitors 402 and 416 are HIGH, and the clock signals (CLK2, CLK4) to capacitors 404 and 418 are LOW. Discharge switch 408 is ON to discharge boost capacitor 402 to the output. Gate-drive capacitor 416 turns charge switch 410 ON to charge boost capacitor 404 and turns gate switch 414 ON to charge gate-drive capacitor 418. Charge switch 406, discharge switch 412, and gate switch 420 are OFF.

Time $t_2$ corresponds to State 2 after CLK3 transitions to LOW to turn OFF charge switch 410 and gate switch 414. Discharge switch 408 remains ON, and charge switch 406, discharge switch 412, and gate switch 420 remain OFF.

Time $t_3$ corresponds to State 3 after CLK2 transitions to HIGH. CLK1 is still HIGH and CLK3 and CLK4 are LOW. All of the switches are OFF. Some discharge current flows from boost capacitor 404 to the output through a parasitic diode of discharge switch 412.

Time t4 corresponds to State 4 after CLK1 transitions to LOW. CLK2 is still HIGH and CLK3 and CLK4 are LOW. Discharge switch 412 is ON to discharge boost capacitor 404 to the output. Some charging current flows to boost capacitor 402 from the input through the parasitic diode of charge switch 406.

Time t5 corresponds to State 5 after CLK4 transitions to HIGH. CLK2 is still HIGH and CLK3 and CLK 1 are LOW. Charge switch 406 is ON to charge boost capacitor 406, and gate switch 420 is ON to charge gate-drive capacitor 416. Discharge switch 412 is still ON to discharge boost capacitor 404 to the output.

Figure 6:
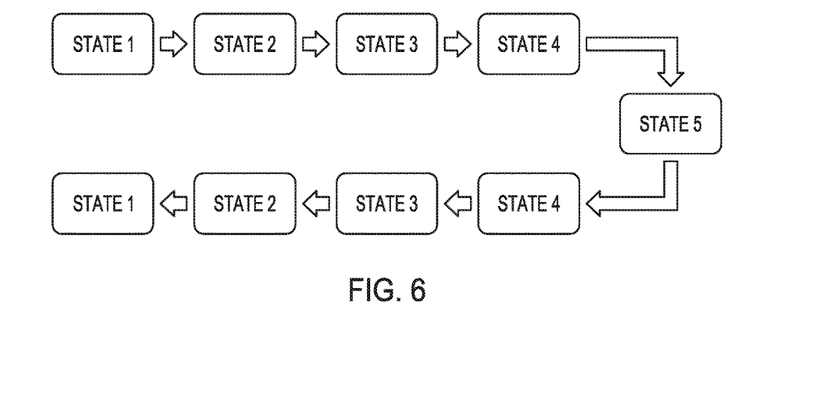
FIG. 6 is a flow diagram of the operating state transitions of a charge pump circuit in an aspect.

The charge pump then progresses through from State 5 through intel mediate States 4-2 back to State 1. At time $t_6$, the charge pump circuit is still in State 5. The charge pump transitions to State 4 at time $t_7$, to State 3 at time $t_8$, to State 2 at time $t_9$, and back to State 1 at time $t_{10}$. FIG. 6 is a flow diagram of the operating state transitions. The clock signals repeat to transition the charge pump circuit from State 1 through intermediates states 2-4 back to state 5.

It can be seen that the charge pump circuit of FIG. 4 cycles between discharging boost capacitor 402 and charging boost capacitor 404 in State 1, and charging boost capacitor 402 and discharging boost capacitor 404 in State 5 to generate boosted voltage VOUT. No reverse current flows in any of the operating states.

Figure 7:
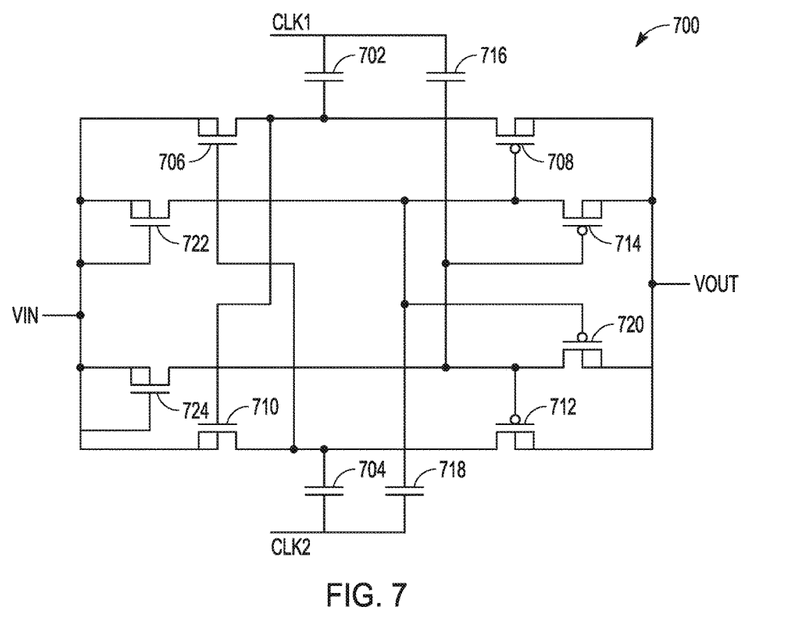
FIG. 7 is a circuit diagram of a charge pump circuit in another aspect.

FIG. 7 is a circuit diagram of a charge pump circuit 700 in another aspect. In this version, the charge pump circuit 700 includes two charge transfer circuit paths as before. However, the boost capacitors are used to control the gate inputs of the charge switches and the gate-drive capacitors are used to control the gate inputs of the discharge switches. Boost capacitor 702 is coupled to the gate input of charge switch 710, and boost capacitor 704 is coupled to the gate input of charge switch 706. Gate drive capacitor 716 is coupled to the gate input of discharge switch 712, and gate-drive capacitor 718 is coupled to the gate input of discharge switch 708.

Another difference is that the gate switches are coupled to the discharge switches instead of the charge switches. Gate switch 714 is coupled to the gate input of discharge switch 708, and gate switch 720 is coupled to the gate input of discharge switch 712. In the example of FIG. 7, gate switches 714 and 720 are PFETs. The gate inputs of gate switches 714 and 720 are shown connected to gate-drive capacitors 716 and 718, respectively.

Still another difference is that the clamping circuit is coupled to limit the voltage at the gate inputs of the discharge switches instead of the charge switches. In FIG. 7, the clamping circuit includes NFETs 722 and 724 that have the source electrically shorted to the gate. In certain aspects, diodes can be substituted for the NTETs. The gate switches and the clamping circuit serve to limit the voltage at the gates of the discharge switches to prevent the voltage across the gate terminals from exceeding the breakdown voltage. The charge pump circuit of FIG. 7 is shown driven by two clock signals. Boost capacitor 702 and gate-drive capacitor 716 are driven by clock signal CLK1, and boost capacitor 704 and gate-drive capacitor 718 are driven by clock signal CLK2. In another aspect, four separate clock signals can be used to drive the four capacitors as in the example of FIG. 4. The four clock signals may provide 4-phase clock signaling as in FIG. 5 to advance the charge pump circuit 700 through five operating states.

Figure 8:
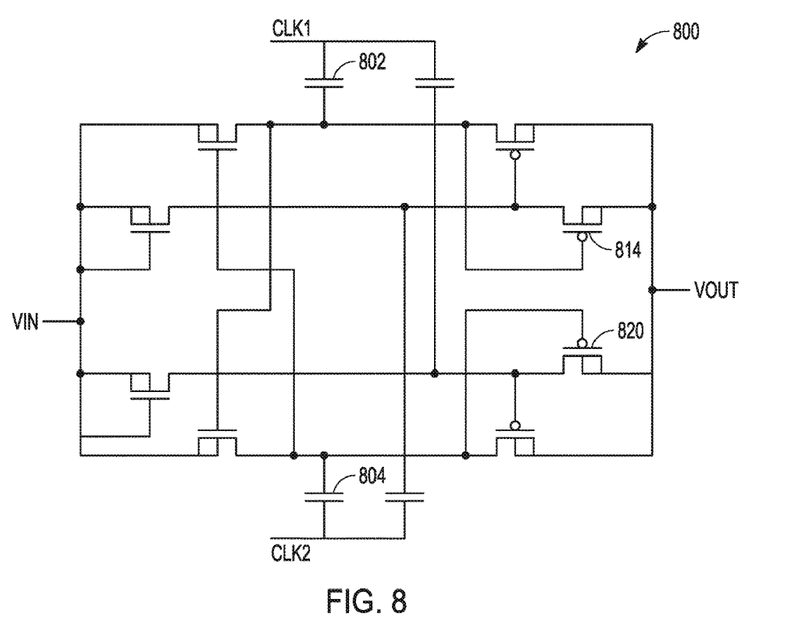
FIG. 8 is a circuit diagram of a charge pump circuit in another aspect.

FIG. 8 is a circuit diagram of a charge pump circuit 800 in another aspect. Similar to the circuit of FIG. 7, the charge pump circuit 800 includes two charge transfer paths and two control circuits. The circuit of FIG. 8 differs from the circuit of FIG. 7 in that the gate input of gate switch 814 is coupled to boost capacitor 802, and the gate input of gate switch 820 is coupled to boost capacitor 804.

Figure 9:
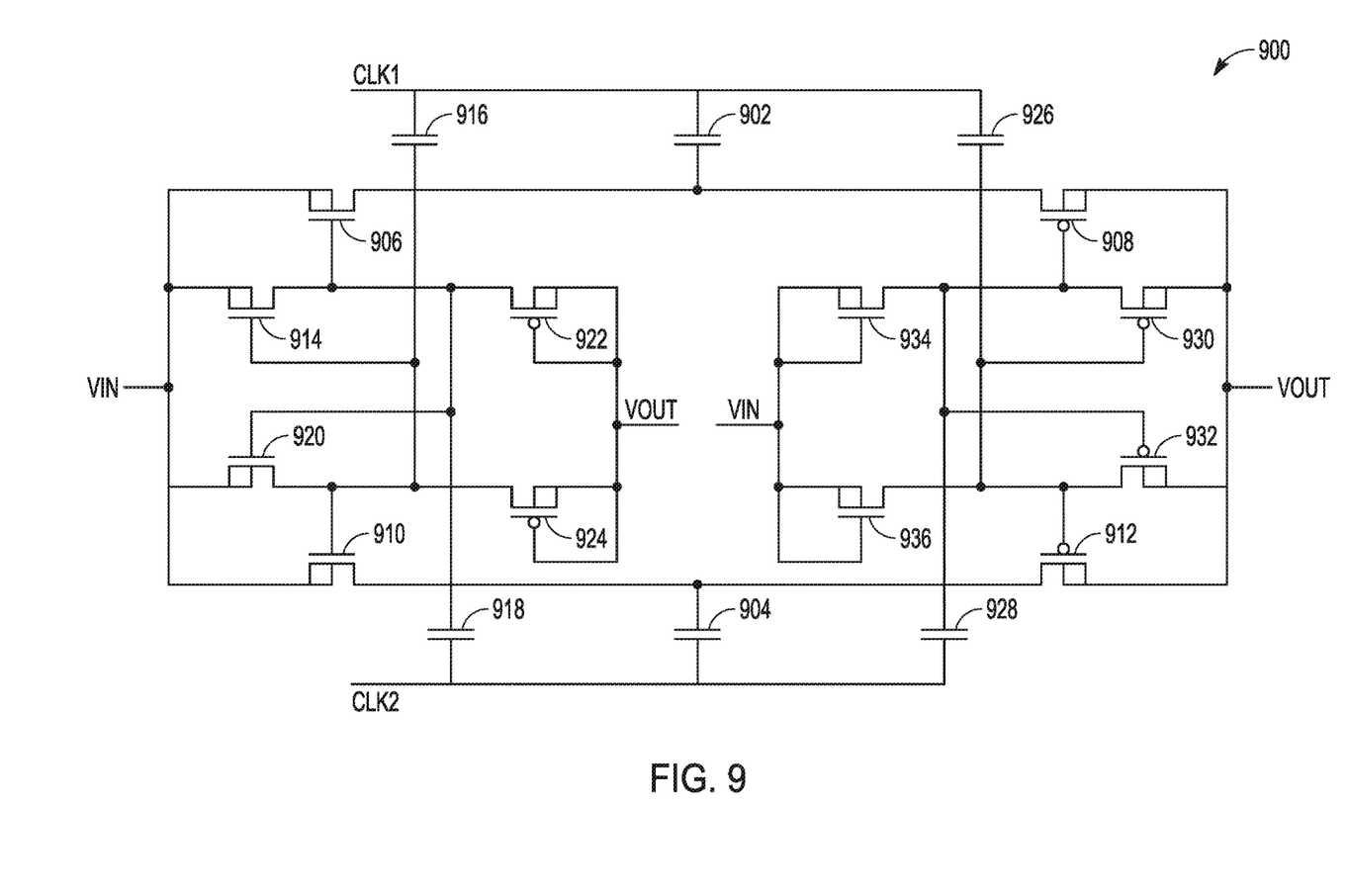
FIG. 9 is a circuit diagram of a charge pump circuit in another aspect.

FIG. 9 is a circuit diagram of a charge pump circuit 900 in another aspect. The charge pump circuit includes two charge transfer circuit paths as in the previous examples. However, the boost capacitors are not used to control either the discharge switches (as in the circuit of FIG. 1) or the charge switches (as in the circuit of FIG. 7). Instead, two additional gate-drive capacitors are used to control both the charge switches and the discharge switches. Similar to FIG. 1, gate-drive capacitor 916 is coupled to the gate input of charge switch 910, and gate-drive capacitor 918 is coupled to the gate input of charge switch 906. Similar to FIG. 7, gate-drive capacitor 926 is coupled to the gate input of discharge switch 912, and gate-drive capacitor 928 is coupled to the gate input of discharge switch 908. Two separate VIN connections and two separate VOUT connections are shown for simplicity, but in actuality the two nodes labeled VIN are a common input connection, and the two nodes labeled VOUT are a common output connection.

The circuit of FIG. 9 includes four gate switches 914, 920, 930, 932. The gate input of the gate switches are each coupled to a gate-drive capacitor. The gate input of gate switch 914 is coupled to gate-drive capacitor 916, the gate input of gate switch 920 is coupled to gate-drive capacitor 918, the gate input of gate switch 930 is coupled to gate-drive capacitor 926, and the gate input of gate switch 932 is coupled to gate-drive capacitor 928. In another aspect, the gate inputs of the gate switches can be coupled to boost capacitors as in the example of FIG. 3. The gate inputs of gate switches 914 and 930 can be coupled to boost capacitor 902, and the gate inputs of gate switches 920 and 932 can be coupled to boost capacitor 904.

The charge pump circuit of FIG. 9 also includes two clamping circuits to limit the gate of the charge switches and discharge switches. One clamping circuit includes PFETs 922 and 924, and the other clamping circuit includes NFETs 934 and 936.

The charge pump circuit of FIG. 9 is shown driven by two clock signals. Boost capacitor 902 and gate-drive capacitors 916 and 926 are driven by clock signal CLK1, and boost capacitor 904 and gate-drive capacitors 918 and 928 are driven by clock signal CLK2. In another aspect, four separate clock signals can be used to drive the six capacitors (similar to the example of FIG. 4) by separating each of CLK1 and CLK 2 into two clock signals. CLK1 can be separated into a first clock signal to drive boost capacitor 902 and a second clock signal to drive gate-drive capacitors 916 and 926. CLK2 can be separated into a first clock signal to drive boost capacitor 904 and a second clock signal to drive gate-drive capacitors 918 and 928. The four clock signals may provide 4-phase clock signaling as in FIG. 5 to advance the charge pump circuit 900 through five operating states.

Figure 10:
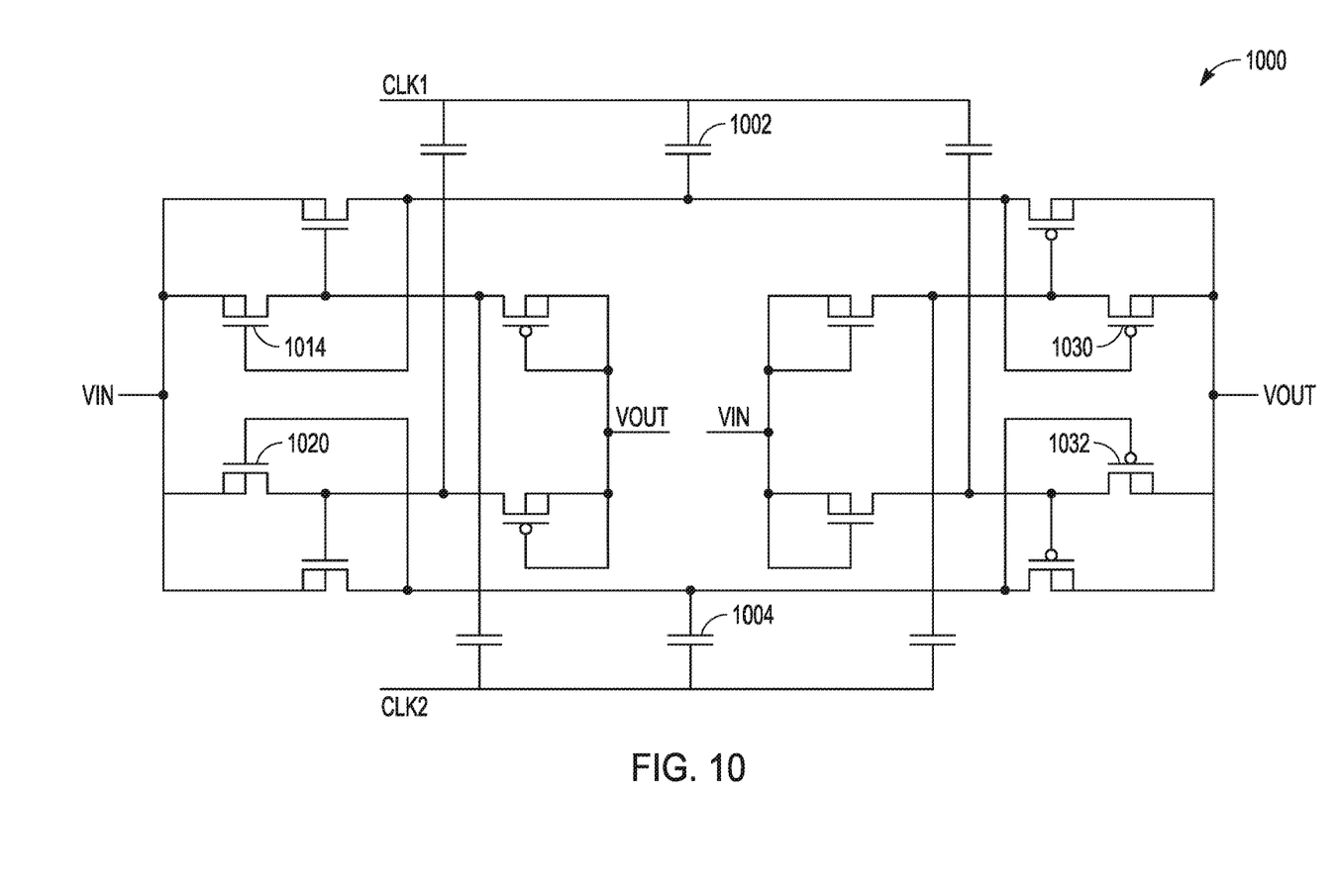
FIG. 10 is a circuit diagram of a charge pump circuit in another aspect.

FIG. 10 is a circuit diagram of a charge pump circuit 1000 in another aspect. The circuit is similar to the circuit of FIG. 9 except that some gate switches are activated using the boost capacitors instead of the gate drive capacitors. The gate input of gate switches 1014 and 1030 are coupled to boost capacitor 1002, and the gate input of gate switches 1020 and 1032 are coupled to boost capacitor 1004.

For the charge pump circuits described previously herein, the generated output voltage VOUT is approximately twice VIN. To generate a higher output voltage, a charge pump circuit can be cascaded in series with more charge pump circuits with the output of one charge pump circuit provided as the input to the next stage. For example, two of the charge pump circuits of FIG. 1 may be cascaded as a first charge pump stage and a second charge pump stage. The first charge pump stage includes first and second charge transfer paths to produce a boosted voltage at the output which is coupled to the input of the second stage input. The second charge pump stage includes third and fourth charge transfer paths to boost the voltage at its input. Each additional stage boosts its input voltage by VIN. The output of the first charge pump stage is approximately two times VIN, and the output of the second charge pump stage is approximately three time VIN. This cascading can be extended to more charge pump stages. The number of times that VIN is boosted is approximately the number of cascaded stages plus one. For example, two charge pump stages generate approximately three times VIN, and three charge pump stages produce approximately four times VIN.

Figure 11:
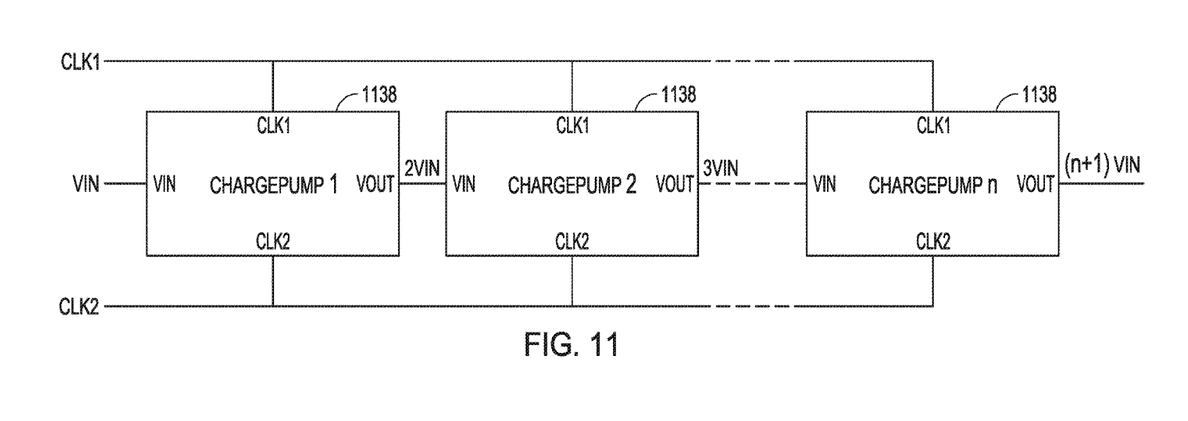
FIG. 11 is a block diagram of a charge pump circuit in another aspect.

FIG. 11 is a circuit diagram of a charge pump circuit 1100 in another aspect. The circuit includes N cascaded charge pump cells, wherein N is a positive integer. Each cell 1138 provides its boosted voltage to the next cell. The charge pump cells can be any of the two clock signal examples in which the clock signals CLK1 and CLK 2 are connected to the boost capacitors and the gate drive capacitors. The charge pump circuit generates approximately N+1 times the input voltage. For example, a charge pump circuit with nine charge pump cells (i.e., N=9) would generate ten times the input voltage.

Figure 12:
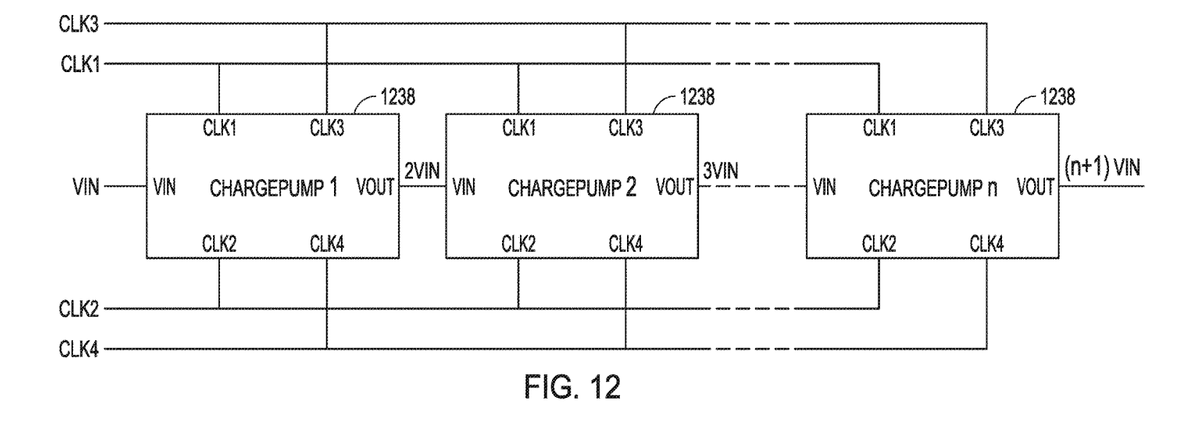
FIG. 12 is a block diagram of a charge pump circuit in another aspect.

FIG. 12 is a circuit diagram of a charge pump circuit 1200 in another aspect. The circuit includes N cascaded charge pump cells, and the charge pump circuit generates approximately N+1 times the input voltage. The charge pump cells 1238 use the 4-phase clocking scheme described herein with separate clock signals driving the boost capacitors and the gate-drive capacitors.

The charge pump cells of FIGS. 11 and 12 do not all have to be the type of cell and can include any combination of the charge pump circuits described herein. However, using the same type simplifies the layout of the charge pump circuit. The charge pump cells can be operated by distributing the same clock signals to the charge pump cells. The charge pump cells may include a clock signal buffer to receive the clock signals from a centralized clock circuit and reduce the load on the distributed clock signals.

The boosted voltage generated by the charge pump circuits described herein can be used in an IC to process signals that are greater than the supply voltage. For example, a circuit designer may want to pass a signal through a switch that has a greater amplitude than the supply voltage provided to the control input of the switch. Normally, passing such a signal through a switch circuit normally would result in the switch being turned off. For example, if the switch circuit includes FET, an input signal having too great an amplitude may result in the gate to source voltage ($V^{GS}$) reaching the breakdown point. This may result in the output signal being clipped at, or slightly below, the supply voltage. Providing the boosted voltage to the control input of the switch resolves the problem.

Figure 13:
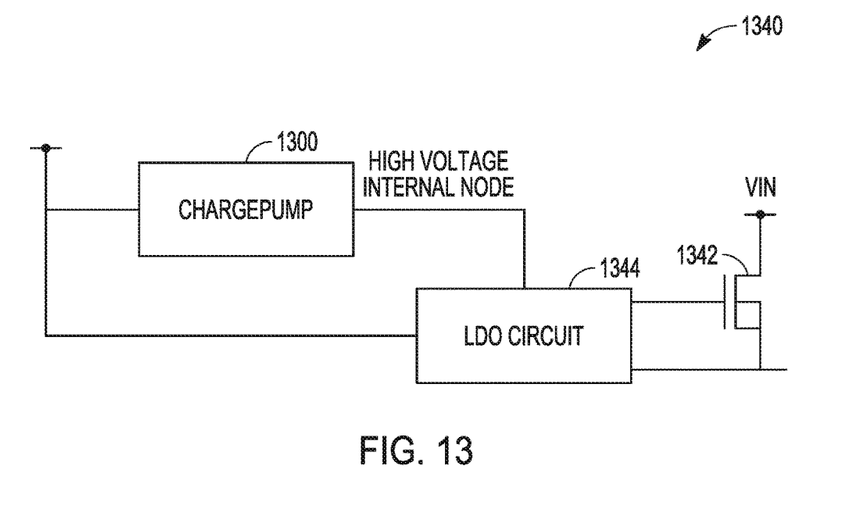
FIG. 13 is a diagram of an electronic circuit in an aspect.

FIG. 13 is a circuit diagram of an electronic circuit 1340 that includes a charge pump circuit 1300, a pass circuit 1342, and a low drop out (LDO) circuit 1344. The charge pump circuit 1300 can be any of the charge pump circuits described herein, including a charge pump circuit formed using multiple cascaded charge pump stages. The pass circuit 1342 can be an NFET. The LDO circuit 1344 provides a regulated voltage to the gate input of the pass circuit 1344.

The charge pump circuits described herein provide several advantages that make them useful for integrated circuit (IC) applications. The minimum input voltage VIN can be close to the threshold level of the switches of the circuits. The maximum VIN is determined by the IC process. For example, a charge pump circuit for an IC with a six volt (6V) process could accommodate a 6.5V maximum VIN. The boost capacitors of the charge pump circuits can be fully integrated. Cascaded cells can provide high gain. Because the charge pump circuits cycle between two charge transfer paths, the charge pump circuits exhibit low ripple on the output voltage. The charge pump circuits are efficient because of reduce parasitic circuit effects at the gate inputs of the switches. Using 4-phase clocking for the charge pump circuits further increases efficiency by preventing reverse current in the circuits.

Additional Description and Aspects

Aspect 1 can include subject matter (such as a charge pump circuit) comprising a first charge transfer circuit path coupled including a first boost capacitor coupled to a first clock input, a first charge switch coupled to a circuit input, and a first discharge switch coupled to a circuit output; a second charge transfer circuit path including a second boost capacitor coupled to a second clock input, a second charge switch coupled to the circuit input, and a second discharge switch coupled to the circuit output; a first charge control circuit including a first gate switch coupled to a gate input of the first charge switch, and a first gate-drive capacitor coupled to a third clock input and the gate input of the second charge switch; and a second charge control circuit including a second gate switch coupled to a gate input of the second charge switch, and a second gate-drive capacitor coupled to a fourth clock input and the gate input of the first charge switch.

In Aspect 2, the subject matter of Aspect 1 optionally includes the first boost capacitor coupled to a gate input of the second discharge switch, and the second boost capacitor coupled to a gate input of the first discharge switch.

In Aspect 3, the subject matter of one or both of Aspects 1 and 2 optionally includes a gate input of the first gate switch coupled to the first gate-drive capacitor, and a gate input of the second gate switch coupled to the second gate-drive capacitor.

In Aspect 4, the subject matter of one or both of Aspects 1 and 2 optionally includes a gate input of the first gate switch coupled to the first boost capacitor, and a gate input of the second gate switch coupled to the second boost capacitor.

In Aspect 5, the subject matter of one or any combination of Aspects 1-4 optionally includes a clamping circuit coupled to limit voltage at the gate input of the first charge switch and the gate input of the second charge switch.

In Aspect 6, the subject matter of one or any combination of Aspects 1-5 optionally includes the first clock input and the third clock input receiving a first clock signal, and the second clock input and the fourth clock input receiving a second clock signal having opposite signal polarity of the first clock signal.

In Aspect 7, the subject matter of one or any combination of Aspects 1-5 optionally includes the first, second, third, and fourth clock inputs each receiving a separate clock signal to advance the charge pump circuit through five operating states.

In Aspect 8, the subject matter of one or any combination of Aspects 1-5 and 7 optionally includes the first, second, third, and fourth clock inputs each receive respective first, second, third and fourth clock signals, wherein the first and second clock signals have opposite polarity and are non-overlapping, and the third and fourth clock signals have opposite polarity and are non-overlapping.

In Aspect 9, the subject matter of one or any combination of Aspects 1-8 optionally includes the first and second charge transfer paths are included in a first charge pump stage between a first stage input and a first stage output; the charge pump circuit further includes a second charge pump stage including third and fourth charge transfer paths coupled between a second stage input and second stage output; and the first stage output is coupled to the second stage input.

In Aspect 10, the subject matter of one or any combination of Aspects 1-9 optionally includes a third gate-drive capacitor coupled to the third clock input and a gate input of the second discharge switch; and a fourth gate-drive capacitor coupled to the fourth lock input and a gate input of the first discharge switch.

Aspect 11 includes subject matter (such as a charge pump circuit or can optionally be combined with one or any combination of Aspects 1-10 to include such subject matter, comprising: a first charge transfer circuit path coupled including a first boost capacitor coupled to a first clock input, a first charge switch coupled to a circuit input, and a first discharge switch coupled to a circuit output; a second charge transfer circuit path including a second boost capacitor coupled to a second clock input, a second charge switch coupled to the circuit input, and a second discharge switch coupled to the circuit output; a first charge control circuit including a first gate switch coupled to a gate input of the first discharge switch, and a first gate-drive capacitor coupled to a third clock input and the gate input of the second discharge switch; and a second charge control circuit including a second gate switch coupled to a gate input of the second discharge switch, and a second gate-drive capacitor coupled to a fourth clock input and the gate input of the first discharge switch.

In Aspect 12, the subject matter of Aspect 11 optionally includes the first boost capacitor coupled to a gate input of the second charge switch, and the second boost capacitor coupled to a gate input of the first charge switch.

In Aspect 13, the subject matter of one or both of Aspects 11 and 12 optionally includes a gate input of the first gate switch is coupled to the first gate-drive capacitor, and a gate input of the second gate switch is coupled to the second gate-drive capacitor.

In Aspect 14, the subject matter of one or any combination of Aspects 11-13 optionally includes a gate input of the first gate switch is coupled to the first boost capacitor, and a gate input of the second gate switch is coupled to the second boost capacitor.

In Aspect 15, the subject matter of one or any combination of Aspects 11-14 optionally includes a clamping circuit coupled to limit voltage at the gate input of the first discharge switch and the gate input of the second discharge switch.

In Aspect 16, the subject matter of one or any combination of Aspects 11-15 optionally includes the first clock input and the third clock input receiving a first clock signal, and the second clock input and the fourth clock input receiving a second clock signal having opposite signal polarity of the first clock signal.

In Aspect 17, the subject matter of one or any combination of Examples 11-15 optionally includes the first, second, third, and fourth clock inputs each receive a separate clock signal to advance the charge pump circuit through five operating states.

In Aspect 18, the subject matter of one or any combination of Aspects 11 and 17 optionally includes the first, second, third, and fourth clock inputs each receive respective first, second, third and fourth clock signals, wherein the first and second clock signals have opposite polarity and are non-overlapping, and the third and fourth clock signals have opposite polarity and are non-overlapping.

In Aspect 19, the subject matter of one or any combination of Aspects 11-18 optionally includes a third gate-drive capacitor coupled to the third clock input and a gate input of the second charge switch; and a fourth gate-drive capacitor coupled to the fourth lock input and a gate input of the first charge switch Aspect 20 can include subject matter (such as an electronic circuit), or can optionally be combined with one or any combination of Examples 1-19 to include such subject matter, comprising a charge pump circuit, a pass circuit, and a low drop out (LDO) circuit. The charge pump circuit includes: a first charge transfer circuit path coupled including a first boost capacitor coupled to a first clock input, a first charge switch coupled to a circuit input, and a first discharge switch coupled to a circuit output; a second charge transfer circuit path including a second boost capacitor coupled to a second clock input and a gate input of the first discharge switch, a second charge switch coupled to the circuit input, and a second discharge switch coupled to the circuit output and including a gate input coupled to the first boost capacitor; a first charge control circuit including a first gate switch coupled to a gate input of the first charge switch, and a first gate-drive capacitor coupled to a third clock input and the gate input of the second charge switch; and a second charge control circuit including a second gate switch coupled to a gate input of the second charge switch, and a second gate-drive capacitor coupled to a fourth clock input and the gate input of the first charge switch. The pass circuit includes a gate input, and the LDO circuit is coupled to the charge pump circuit output and configured to provide a regulated voltage to the gate input of the pass circuit.

In Aspect 21, the subject matter of Aspect 20 optionally includes the first clock input and the third clock input receiving a first clock signal, and the second clock input and the fourth clock input receiving a second clock signal having opposite signal polarity of the first clock signal.

In Aspect 22, the subject matter of Aspect 20 optionally includes the first, second, third, and fourth clock inputs each receive a separate clock signal to advance the charge pump circuit through five operating states.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A charge pump circuit comprising:
   a first charge transfer circuit path coupled including a first boost capacitor coupled to a first clock input, a first charge switch coupled to a circuit input, and a first discharge switch coupled to a circuit output, wherein a source-or-drain connection of the first charge switch is coupled to a source-or-drain connection of the first discharge switch;
   a second charge transfer circuit path including a second boost capacitor coupled to a second clock input, a second charge switch coupled to the circuit input, and a second discharge switch coupled to the circuit output, wherein a source-or-drain connection of the second charge switch is coupled to a source-or-drain connection of the second discharge switch;
   a first charge control circuit including a first gate switch coupled to a gate input of the first charge switch, and a first gate-drive capacitor coupled to a third clock input and the gate input of the second charge switch; and
   a second charge control circuit including a second gate switch coupled to a gate input of the second charge switch, and a second gate-drive capacitor coupled to a fourth clock input and the gate input of the first charge switch.

2. The charge pump circuit of claim 1, wherein the first boost capacitor is coupled to a gate input of the second discharge switch, and the second boost capacitor is coupled to a gate input of the first discharge switch.

3. The charge pump circuit of claim 1, wherein a gate input of the first gate switch is coupled to the first gate-drive capacitor, and a gate input of the second gate switch is coupled to the second gate-drive capacitor.

4. The charge pump circuit of claim 1, wherein a gate input of the first gate switch is coupled to the first boost capacitor, and a gate input of the second gate switch is coupled to the second boost capacitor.

5. The charge pump circuit of claim 1, including a clamping circuit coupled to limit voltage at the gate input of the first charge switch and the gate input of the second charge switch.

6. The charge pump circuit of claim 1, wherein the first clock input and the third clock input receive a first clock signal, and the second clock input and the fourth clock input receive a second clock signal having opposite signal polarity of the first clock signal.

7. The charge pump circuit of claim 1, wherein the first, second, third, and fourth clock inputs each receive a separate clock signal to advance the charge pump circuit through five operating states.

8. The charge pump circuit of claim 1, wherein the first; second, third, and fourth clock inputs each receive respective first, second, third and fourth clock signals, wherein the first and second clock signals have opposite polarity and are non-overlapping, and the third and fourth clock signals have opposite polarity and are non-overlapping.

9. The charge pump circuit of claim 1, wherein the first and second charge transfer paths are included in a first charge pump stage between a first stage input and a first stage output;
   the charge pump circuit further includes a second charge pump stage including third and fourth charge transfer paths coupled between a second stage input and second stage output; and
   the first stage output is coupled to the second stage input.

10. The charge pump circuit of claim 1, including:
    a third gate-drive capacitor coupled to the third clock input and a gate input of the second discharge switch; and
    a fourth gate-drive capacitor coupled to the fourth lock input and a gate input of the first discharge switch.

11. A charge pump circuit comprising:
    a first charge transfer circuit path coupled including a first boost capacitor coupled to a first clock input, a first charge switch coupled to a circuit input, and a first discharge switch coupled to a circuit output, wherein a source-or-drain connection of the first charge switch is coupled to a source-or-drain connection of the first discharge switch;
    a second charge transfer circuit path including a second boost capacitor coupled to a second clock input, a second charge switch coupled to the circuit input, and a second discharge switch coupled to the circuit output wherein a source-or-drain connection of the second charge switch is coupled to a source-or-drain connection of the second discharge switch;
    a first charge control circuit including a first gate switch coupled to a gate input of the first discharge switch, and a first gate-drive capacitor coupled to a third clock input and the gate input of the second discharge switch; and a second charge control circuit including a second gate switch coupled to a gate input of the second discharge switch, and a second gate-drive capacitor coupled to a fourth clock input and the gate input of the first discharge switch.

12. The charge pump circuit of claim 11, wherein the first boost capacitor is coupled to a gate input of the second charge switch, and the second boost capacitor is coupled to a gate input of the first charge switch.

13. The charge pump circuit of claim 11, wherein a gate input of the first gate switch is coupled to the first gate-drive capacitor, and a gate input of the second gate switch is coupled to the second gate-drive capacitor.

14. The charge pump circuit of claim 11, wherein a gate input of the first gate switch is coupled to the first boost capacitor, and a gate input of the second gate switch is coupled to the second boost capacitor.

15. The charge pump circuit of claim 11, including a clamping circuit coupled to limit voltage at the gate input of the first discharge switch and the gate input of the second discharge switch.

16. The charge pump circuit of claim 11, wherein the first clock input and the third clock input receive a first clock signal, and the second clock input and the fourth clock input receive a second clock signal having opposite signal polarity of the first clock signal.

17. The charge pump circuit of claim 11, wherein the first, second, third, and fourth clock inputs each receive a separate clock signal to advance the charge pump circuit through five operating states.

18. The charge pump circuit of claim 11, wherein the first, second, third, and fourth clock inputs each receive respective first, second, third and fourth clock signals, wherein the first and second clock signals have opposite polarity and are non-overlapping, and the third and fourth clock signals have opposite polarity and are non-overlapping.

19. The charge pump circuit of claim 11, including:
a third gate-drive capacitor coupled to the third clock input and a gate input of the second charge switch; and
a fourth gate-drive capacitor coupled to the fourth lock input and a gate input of the first charge switch.

20. The charge pump circuit of claim 1, including:
a pass circuit including a gate input; and
a low drop out (LDO) circuit coupled to the charge pump circuit output and configured to provide a regulated voltage to the gate input of the pass circuit.

21. The charge pump circuit of claim 20, wherein the first clock input and the third clock input receive a first clock signal, and the second clock input and the fourth clock input receive a second clock signal having opposite signal polarity of the first clock signal.

22. The charge pump circuit of claim 20, wherein the first, second, third, and fourth clock inputs each receive a separate clock signal to advance the charge pump circuit through five operating states.

23. A method of operating a charge pump circuit, the method comprising:
charging a first boost capacitor using a circuit input and a first clock input, wherein the charging of the first boost capacitor is controlled using a first charge switch and discharging of the first boost capacitor to a circuit output is controlled using a first discharge switch coupled to the first charge switch;
charging a second boost capacitor using the circuit input and a second clock input, wherein the charging of the second boost circuit is controlled using a second charge switch and discharging of the second boost capacitor to the circuit output is controlled using a second discharge switch coupled to the second charge switch;
charging a first drive capacitor using the first clock input and charging a second drive capacitor using the second clock input;
turning on the first charge switch using the second drive capacitor to charge the first boost capacitor and turning on the first discharge switch using the second boost capacitor to discharge the first boost capacitor; and
turning on the second charge switch using the first drive capacitor to charge the second boost capacitor and turning on the second discharge switch using the first boost capacitor to discharge the second boost capacitor.

24. The method of claim 23, including regulating the output of the charge pump circuit using a low drop out circuit.

25. The method of claim 24, including providing the regulated output to a gate input of a pass circuit.

* * * * *